(12) United States Patent
Morihisa

(10) Patent No.: US 8,477,211 B2
(45) Date of Patent: Jul. 2, 2013

(54) IMAGING APPARATUS AND IMAGE CAPTURING METHOD

(75) Inventor: Taijiro Morihisa, Tokyo (JP)

(73) Assignee: Ricoh Company, Ltd., Tokyo (JP)

(*) Notice: Subject to any disclaimer, the term of this patent is extended or adjusted under 35 U.S.C. 154(b) by 0 days.

(21) Appl. No.: 13/214,883

(22) Filed: Aug. 22, 2011

(65) Prior Publication Data

US 2012/0062780 A1 Mar. 15, 2012

(30) Foreign Application Priority Data

Sep. 15, 2010 (JP) ................................. 2010-206521

(51) Int. Cl.
*H04N 5/228* (2006.01)
(52) U.S. Cl.
USPC ........ 348/222.1; 348/335; 348/340; 348/345; 348/348; 348/349
(58) Field of Classification Search
USPC .............. 348/222.1, 335, 340, 345, 348, 349, 348/373–376; 396/72, 79, 100
See application file for complete search history.

(56) References Cited

U.S. PATENT DOCUMENTS

2008/0002430 A1* 1/2008 Kanade et al. ................ 362/613
2009/0161026 A1* 6/2009 Wu et al. ....................... 348/734

FOREIGN PATENT DOCUMENTS

JP 2003-140216 5/2003

* cited by examiner

*Primary Examiner* — Yogesh Aggarwal
(74) *Attorney, Agent, or Firm* — Oblon, Spivak, McClelland, Maier & Neustadt, L.L.P.

(57) ABSTRACT

An imaging apparatus includes a first image capturing unit that captures first image data through a first optical system, a second image capturing unit that captures second image data through a second optical system, and a mode switching unit that switches between a normal mode and a power saving and speedy capturing mode that has a lower consumed power than the normal mode. In a case of operating in the power saving and speedy capturing mode, an operation stopping unit stops the first image capturing unit and the control unit captures an image by use of the second image capturing unit. A battery remaining amount can also be detected. In a case the battery remaining amount is less than a threshold value, a display mode switching unit switches from first display mode displaying a monitored image of first image data to a second display mode displaying a monitored image of second image data.

17 Claims, 8 Drawing Sheets

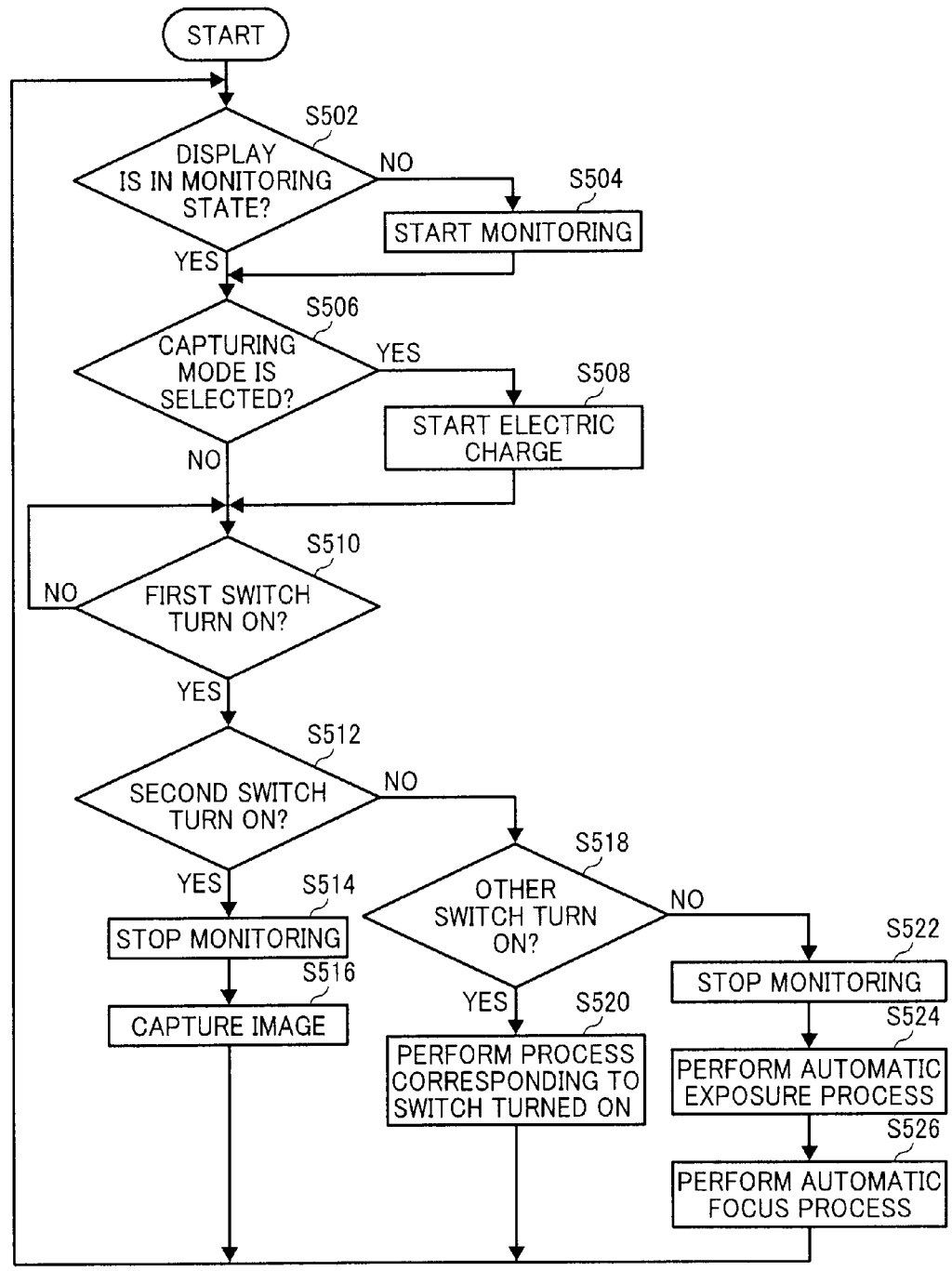

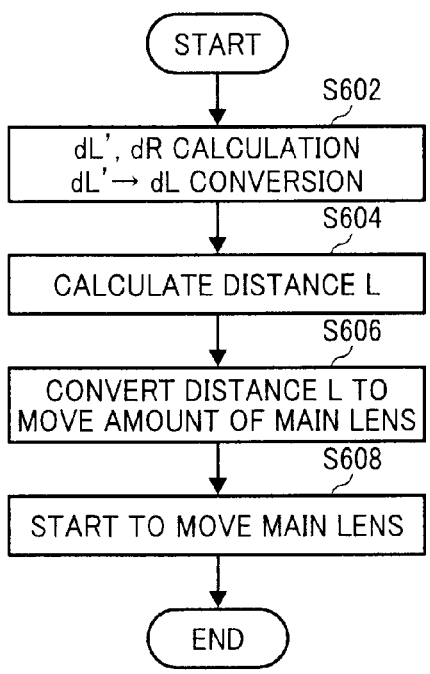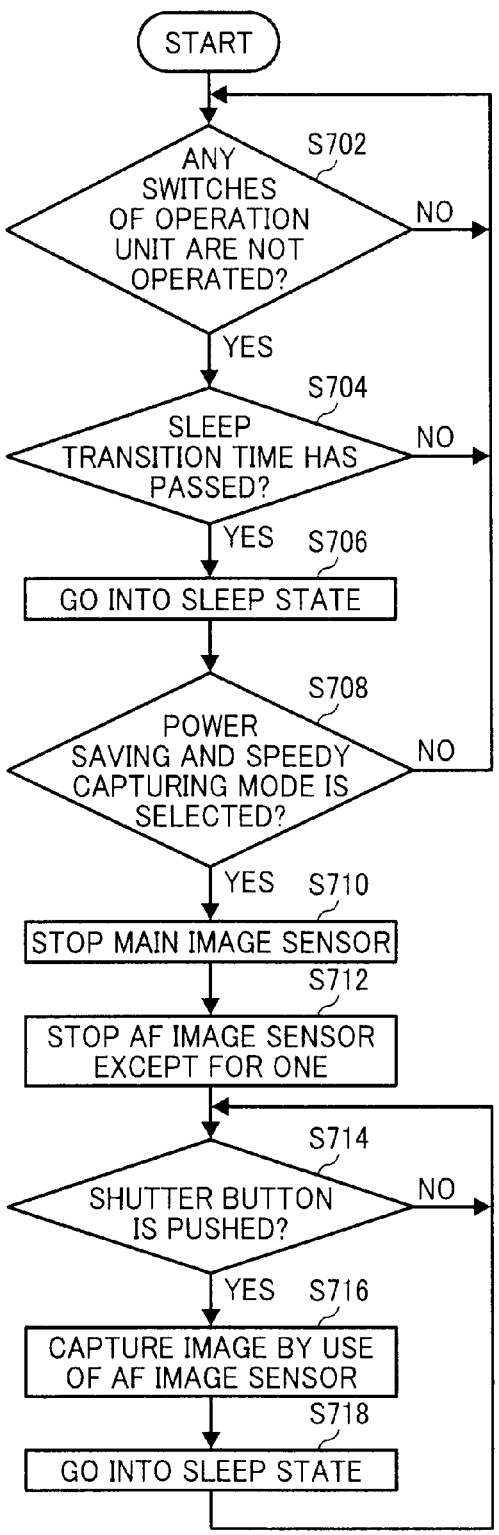

IMAGING APPARATUS AND IMAGE CAPTURING METHOD

CROSS REFERENCE TO RELATED APPLICATIONS

This application claims the benefit of priority under 35 USC §119 from Japanese Patent Application No. 2010-206521, filed Sep. 15, 2010, the entire contents of which are incorporated herein by reference.

BACKGROUND OF THE INVENTION

1. Field of the Invention

The present invention relates to an imaging apparatus and an image capturing method.

2. Description of the Related Art

In recent years, a digital camera includes various sensors and these sensors are getting larger and larger. These sensors include sensors for AF (Auto Focus). Also, the number of pixels of a digital camera is getting higher and higher. Therefore, a consumed power of a digital camera is getting higher and higher.

On the other hand, it is desirable to downsize a digital camera and to achieve weight saving. To effectively downsize and save weight in a digital camera, a battery of a digital camera is required to be downsized. A capacity of the battery is therefore getting smaller due to downsizing of the battery. The number of images available to be captured then gets smaller because a capacity of the battery is getting smaller. A reduction in the number of captured images is undesirable.

As an example of a technique to reduce consumed power, when a digital camera is not operated for more than a predetermined time, the digital camera can turn off a sensor or a display. But in a case a sensor is not constantly running for power saving, it becomes possible to miss a shutter chance because even after the sensor is activated the digital camera may perform an autofocus (AF) operation, which may cause missing the shutter chance.

Also, to speedily capture an image, in a case a camera is set to a speedy capturing mode, an imaging apparatus that prohibits performing an early phase driving of lens is disclosed (for example, see Japanese Publication No. 2003-140216). Such an imaging apparatus, when going into a waiting mode, does not perform a storing operation of the lens with keeping with the speedy capturing mode. Such an imaging apparatus, when a power source is turned on, does not perform the early phase driving of lens with keeping with the speedy capturing mode. Because such an imaging apparatus still needs time for getting started for operating a sensor and providing electric power for an AF operation, that imaging apparatus has a problem in not balancing a reduction of consumed power and still allowing a speedy capturing operation.

BRIEF SUMMARY

It is an object of the present invention to at least partially solve problems in the related technology.

According to an aspect of the present invention, an imaging apparatus and image capturing method can reduce consumed power and still speedily capture an image.

One embodiment provides an imaging apparatus including a first image capturing unit that captures first image data through a first optical system, a second image capturing unit that captures second image data through a second optical system, a control unit that controls to capture an image, a mode switching unit that switches between a normal mode and a power saving and speedy capturing mode, which has a lower consumed power than the normal mode but that speedily captures an image, and an operation stopping unit that stops the first image capturing unit or the second image capturing unit. In a case of operating in the power saving and speedy capturing mode, the operation stopping unit stops the first image capturing unit and the control unit captures an image by use of the second image capturing unit.

Also, one embodiment provides an imaging apparatus including a first image capturing unit that captures first image data through a first optical system, a second image capturing unit that captures second image data through a second optical system, a control unit that controls to capture an image, a display mode switching unit that switches between a first display mode that displays a monitored image of first image data or a second display mode that displays a monitored image of second image data, and a battery monitoring unit that monitors a battery remaining amount. In a case the battery remaining amount is less than a threshold value, the display mode switching unit switches from the first display mode to the second display mode.

BRIEF DESCRIPTION OF THE DRAWINGS

FIG. 5 is a flowchart illustrating an example of an operation of an imaging apparatus;

FIG. 6 is a flowchart illustrating an example of a method of an automatic focus process of an imaging apparatus;

FIG. 7 is a flowchart illustrating an example of an operation of a power saving and speedy capturing mode of an imaging apparatus;

DETAILED DESCRIPTION

Hereinafter, an embodiment of an imaging apparatus and an image capturing method according to aspects of the present invention will be described with reference to the drawings.

Figure 1A:
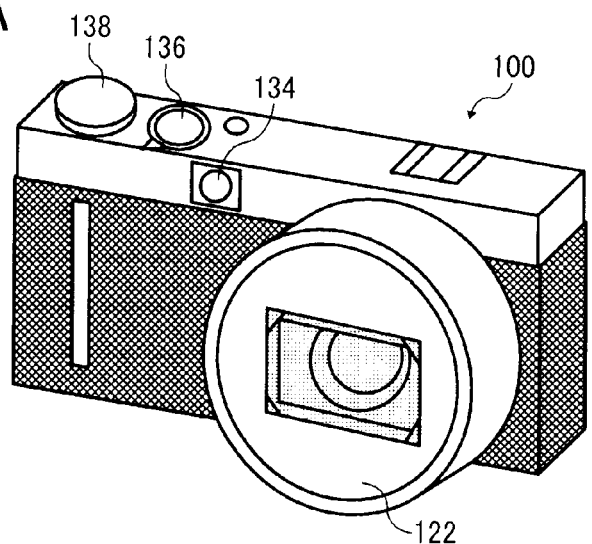
FIG. 1A illustrates a front view of schematic diagrams showing the appearance of an imaging apparatus with one AF sensor.
Figure 1B:
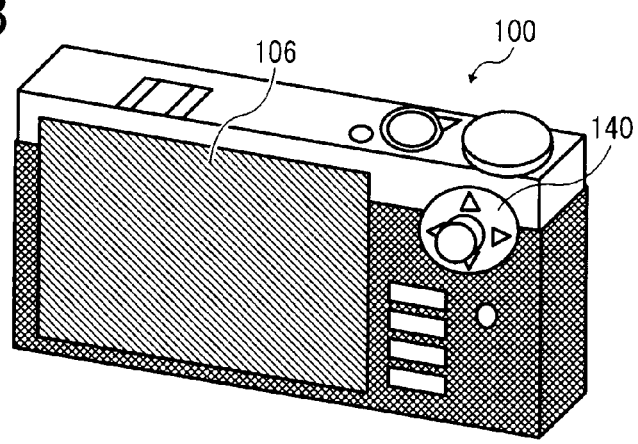
FIG. 1B illustrates a back view of schematic diagrams showing the appearance of an imaging apparatus.
Figure 1C:
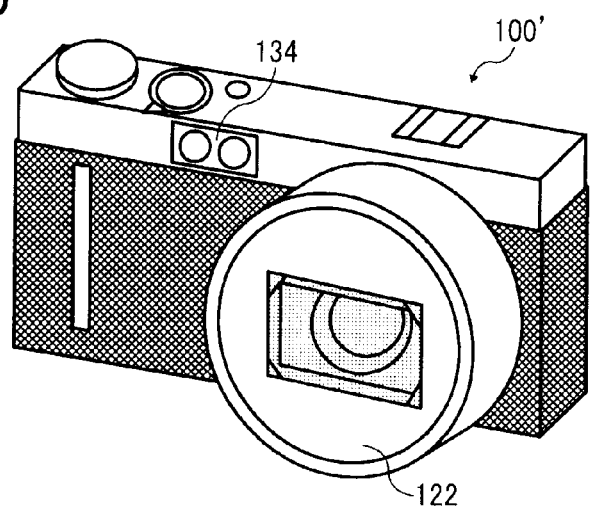
FIG. 1C illustrates a front view of schematic diagrams showing the appearance of a modified imaging apparatus with two AF sensors.

FIGS. 1A to 1C illustrate schematic diagrams showing the appearance of an imaging apparatus 100 and a modified imaging apparatus 100'.

The imaging apparatus 100, 100' can be set to a power saving and speedy capturing mode that can have lower power consumptions than a normal mode and shorten times from activating to capturing an image, and can stop to activate a main image sensor. In that case, the imaging apparatus 100, 100' measures a distance to a subject by use of an AF image sensor.

Also, the imaging apparatus 100, 100', in a case that a battery remaining amount is less than a threshold value, activates the AF image sensor only. For example, in a case the battery remaining amount is not less than the threshold value, the main image sensor may be activated with activation of the AF image sensor.

Furthermore, the imaging apparatus 100, 100' may constantly be activating the AF image sensor.

A consumed power of the AF image sensor is lower than that of the main image sensor. Thereby, the consumed power can be reduced in comparison with a case that both the main image sensor and the AF image sensor are constantly activated. Furthermore, the imaging apparatus can speedily capture an image because the AF image sensor is constantly activated.

Therefore, by constantly activated the AF image sensor only for capturing an image, which has a lower consumed power than the main image sensor, an image can be captured speedily and a consumed power can be reduced. Also, in a case the battery remaining amount is less than the threshold value, by constantly activating the AF image sensor only, which has a lower consumed power than the main image sensor, an image can be captured speedily and a consumed power can be reduced.

Hereinafter, the image apparatus 100, 100' is described with reference to the drawings in detail.

Figure 10:
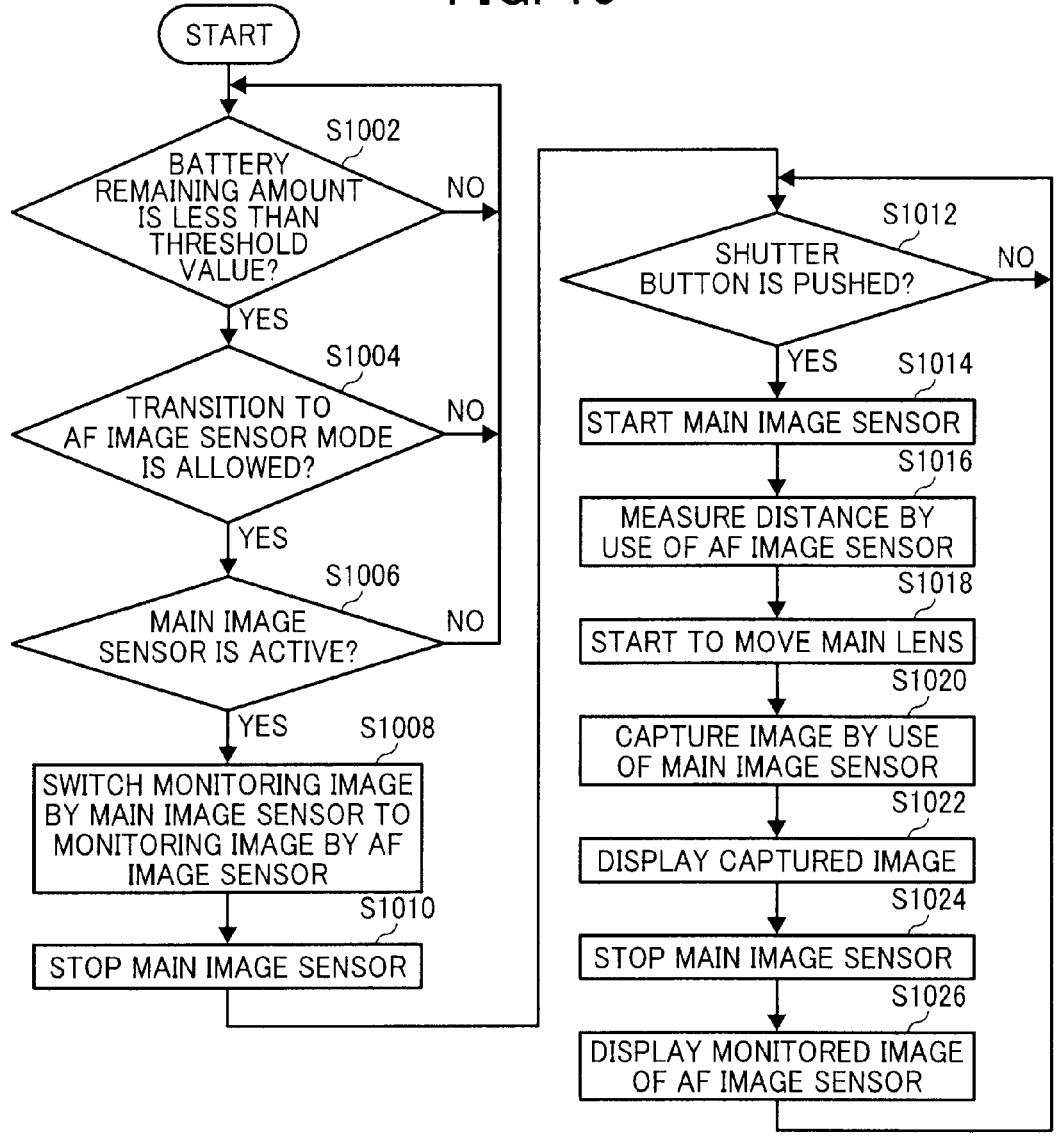
FIG. 10 is a flowchart illustrating an example of another operation considering a battery remaining amount of an imaging apparatus.

FIG. 1A illustrates a front view of schematic diagrams showing the appearance of the imaging apparatus 100 with one AF image sensor. FIG. 1B illustrates a back view of schematic diagrams showing the appearance of the imaging apparatus 100. FIG. 10 illustrates a front view of schematic diagrams showing the appearance of the imaging apparatus 100' with two AF image sensors.

As shown in FIG. 1A, the front face of the imaging apparatus 100 includes an imaging optical system 122 and an AF optical system 134. The imaging optical system 122 includes an imaging lens 124 that includes a focus lens, and (see FIG. 2A) a first image sensor 126 that captures an image of a subject through the imaging lens 124. The AF optical system 134 includes an AF lens 1342, and (see FIG. 2A) a second image sensor 1344 that captures a subject image through the AF lens 1342.

Hereinafter, the imaging optical system 122 activates a main image sensor 126, sensing image data for calculating a distance L as main image data. Also, the AF optical system 134 activates an AF image sensor 1344, and senses image data for calculating a distance L as AF image data. The imaging optical system 122 and the AF optical system 134 are placed at separate positions, as shown in FIG. 1A.

Also, as shown in FIG. 1A, the top face of the imaging apparatus 100 includes a release switch 136, and a mode dial switch 138. For example, the mode dial switch 138 selects capturing modes. For example, the release switch 136 has two switch functions, when the release switch 136 is pushed in half-way (hereinafter, a first switch), it emits a first release signal, and when the release switch 136 is pushed in full (hereinafter, a second switch), it emits a second release signal.

As shown in FIG. 1B, the back face of the imaging apparatus 100 includes a display 106 and a jog switch 140. The display 106 displays a subject image captured by the imaging optical system 122 and the AF optical system 134. Also, the display 106 displays various setting information of the imaging apparatus 100. The jog switch 140 alternates various setting information of the imaging apparatus 100.

Also, as shown in FIG. 1C, the front face of the imaging apparatus 100' includes the imaging optical system 122 same as in FIG. 1A, and a modified AF optical system 134, not the same as FIG. 1A. The AF optical system 134 performs AF process by use of AF image data captured by the AF lenses through two AF lenses.

FIG. 1C shows an example in which the AF optical system 134 includes two AF lenses, but more than two AF lenses can be utilized. In the same way as in the imaging apparatus 100 of FIG. 1A, the top face of the imaging apparatus 100' includes the release switch 136 and the mode dial switch 138.

Figure 2A:
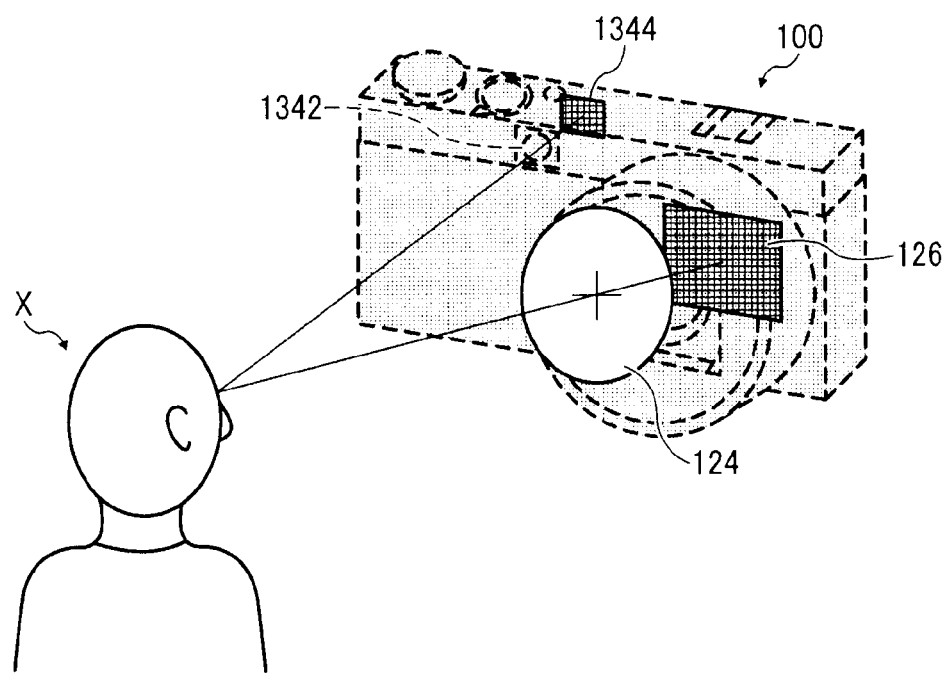
FIG. 2A illustrates a front transparent view of schematic diagrams showing the appearance of an imaging apparatus with one AF sensor.
Figure 2B:
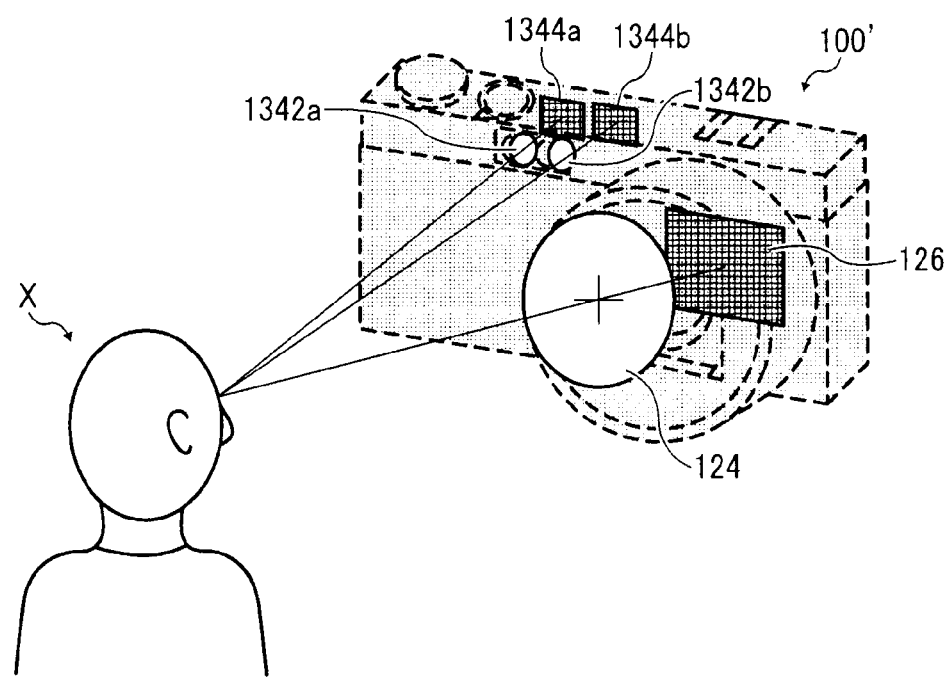
FIG. 2B illustrates a front transparent view of schematic diagrams showing the appearance of a modified imaging apparatus with two AF sensors.

FIG. 2A illustrates a front transparent view of schematic diagrams showing the appearance of the imaging apparatus 100, as shown in FIG. 1A, with one AF image sensor. FIG. 2B illustrates a front transparent view of schematic diagrams showing the appearance of the imaging apparatus 100', as shown in FIG. 1C, with two AF image sensors.

As shown in FIG. 2A, the imaging apparatus 100 includes the first or main image sensor 126 that captures main image data through the imaging lens 124. Also, the imaging apparatus 100 includes the second or AF image sensor 1344 that captures AF image data through the AF lens 1342.

The imaging lens 124 and the AF lens 1342 are placed at separate positions, and a center axis of the AF lens 1342 is placed with an incline toward the imaging lens 124. A field angle of the second image sensor 1344 is placed with an incline toward the imaging optical system 122 because the center axis of the AF lens 1342 is placed with an incline toward the imaging lens 124.

A distance measurement to a subject X can be calculated by use of the imaging optical system 122 and the AF optical system 134, based on the principle of triangulation. Due to parallax that occurs in the images between a first image of the subject X captured by the first image sensor 126 and a second image of the subject X captured by the second image sensor 1344, gaps occur between the position of the first image of the subject X in main image data and the position of the second image of the subject X in AF image data. Due to the gaps, a case can arise in which an image of the subject X does not exist in a distance measurement area (focusing area) and the subject X cannot be accurately focused.

Also, as shown in FIG. 2B, the imaging apparatus 100' includes the first image sensor 126 that captures main image data through the imaging lens 124, two lenses of an AF lens 1342a and an AF lens 1342b, and two image sensors of a second image sensor 1344a and a second image sensor 1344b that capture AF image data through the two lenses of the AF lens 1342a and the AF lens 1342b. In this case, the distance measurement to a subject X is calculated by use of a first AF optical system that includes the AF lens 1342a and the second image sensor 1344a and a second AF optical system that includes the AF lens 1342b and the second image sensor 1344b. If the number of the AF lenses is more than two, the number of the second image sensors is also more than two.

Figure 3:
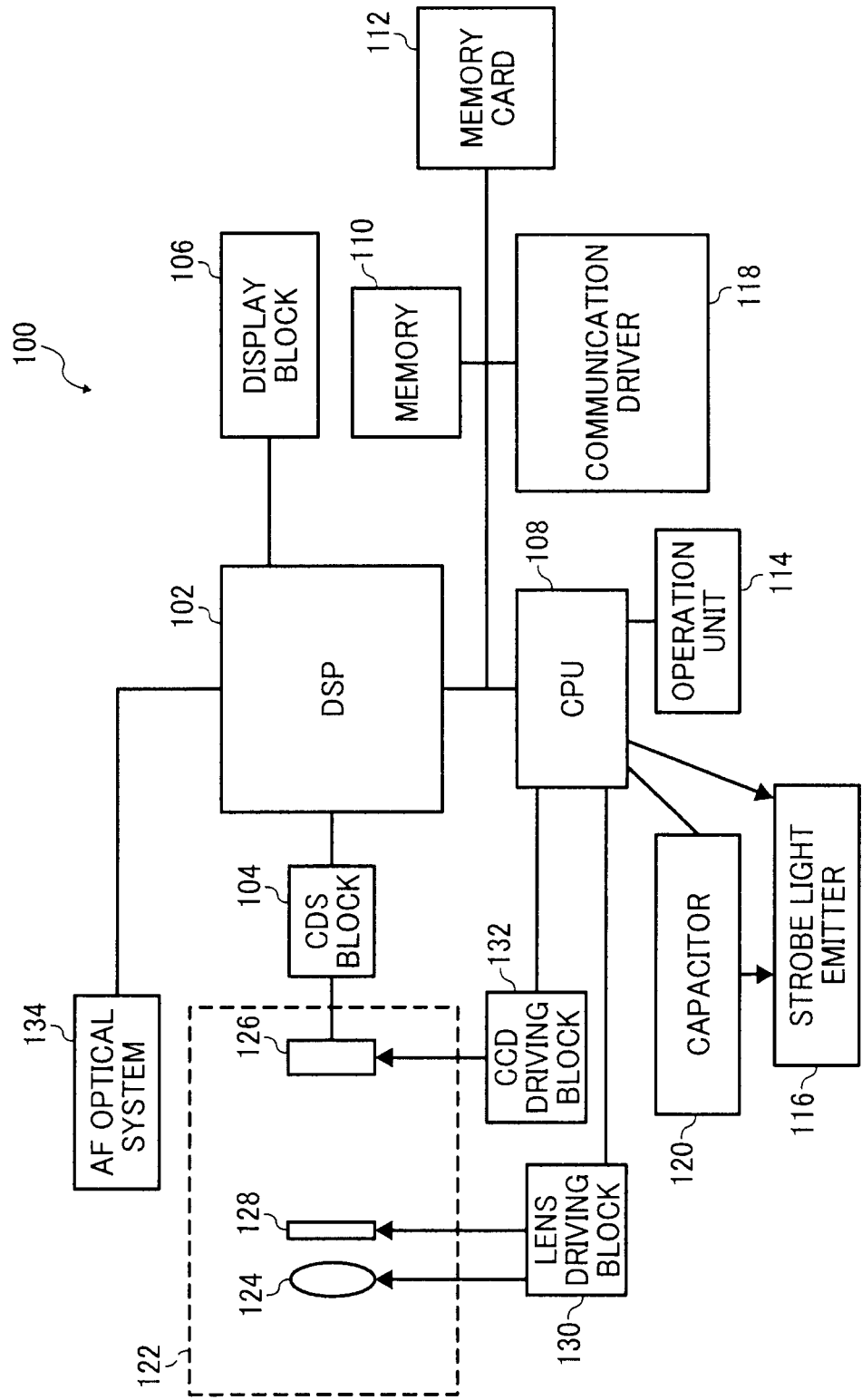
FIG. 3 illustrates a block diagram showing the hardware configuration of an imaging apparatus.

FIG. 3 illustrates a block diagram showing the hardware configuration of the imaging apparatus 100.

As shown in FIG. 3, the imaging apparatus 100 includes a DSP (digital signal processor) 102, a CDS (correlated double sampling) block 104, a display block 106, a CPU 108, a memory 110, a memory card 112, an operation unit 114, a strobe light emitter 116, a communication driver 118, a capacitor 120, an aperture/shutter 128, a lens driving block 130, and a CCD driving block 132.

The CPU 108 controls to drive the lens driving block 130 when the imaging lens 124 moves to a focusing position. The CPU 108 controls to drive the lens driving block 130 when the lens driving block 130 operates the aperture/shutter 128. The CPU 108 controls operations for capturing each image when the imaging optical system 122 and the AF optical system 134 capture each image. The operations include an operation for capturing main image data and AF image data. The CPU 108 controls to process the AF image data captured by the AF optical system 134 in a predetermined image processing.

Also, the CPU 108 controls to process a predetermined processing according to operation signals input by the operation unit 114. The operation unit 114 includes the release switch 136, the mode dial switch 138, and the jog switch 140. For example, the CPU 108 controls to process an AF processing of the AF optical system 134 based on the first release signal (half pressing) of the release switch 136, and an image capturing processing of the imaging optical system 122 based on the second release signal (full pressing) of the release switch 136.

Also, the CPU 108 controls to detect charge voltages of the capacitor 120. The CPU 108 controls to emit a strobe light from the strobe light emitter 116 based on the charge voltages of the capacitor 120.

Also, the CPU 108 controls the communication driver 118 to communicate to an external device.

A subject image forming an image on the first image sensor 126 through the imaging lens 124 is converted into electric signals in photoelectric conversion. The CDS block 104 performs a CDS processing and an A/D (analog/digital) conversion processing for the electric signals. The CDS block 104 outputs data, after performing the CDS processing and the A/D conversion processing, to the DSP 102.

The CCD driving block 132, connected to the CPU 108, controls an output timing of data from the CDS block 104 to the DSP 102 based on controls of the CPU 108. The data may be RAW-RGB data.

The DSP 102, connected to the CDS block 104 and the CPU 108, converts data input from the CDS block 104 to image data in, for example, a YUV format. A YUV of the image data shows a brightness signal (Y), a color difference between the brightness signal and a blue component (U), and a color difference between the brightness signal and a red component (V). The YUV format shows colors by use of three data of "Y", "U", and "V". Also, the DSP 102 can compress the image data of YUV format into a JPEG format. The DSP 102 stores the image data of JPEG format in the memory 110. The DSP 102 may store the image data of JPEG format in the memory card 112. Also, the DSP 102 outputs data input from the CDS block 104 to the display block 106. The display block 106 displays the subject image captured by the first image sensor 126 through the imaging lens 124.

The imaging optical system 122 includes the imaging lens 124, the aperture/shutter 128, and the first image sensor 126. The first image sensor 126 is connected to the CDS block 104 and the CCD driving block 132. The first image sensor 126 may be, for example, a CCD image sensor or a CMOS image sensor.

The lens driving block 130 is connected to the imaging lens 124 and the aperture/shutter 128. The lens driving block 130 drives the imaging lens 124 toward a focusing position based on controls from the CPU 108. Also, the lens driving block 130 drives the aperture/shutter 128 based on controls from the CPU 108.

The AF optical system 134 is connected to the DSP 102. The AF optical system 134 includes the AF lens 1342 and the second image sensor 1344. The AF optical system 134 may include two lenses of the AF lens 1342a and the AF lens 1342b (see FIGS. 1C, 2C). In the case the AF optical system 134 includes two lenses of the AF lens 1342a and the AF lens 1342b, the second image sensor 1344 includes two image sensors of the second image sensor 1344a and the second image sensor 1344b. The AF optical system 134 captures an image. The image captured by the AF optical system 134 may be displayed on the display block 106.

The capacitor 120 is connected to the CPU 108. The capacitor 120 charges voltages. The capacitor 120 applies voltages to the strobe light emitter 116 based on controls of the CPU 108.

The strobe light emitter 116 is connected to the CPU 108 and the capacitor 120. The strobe light emitter 116 emits lights based on controls from the CPU 108.

The operation unit 114 is connected to the CPU 108. The operation unit 114 includes the release button 136, the mode dial switch 138, and the jog switch 140. The operation unit 114 inputs operation signals to the CPU 108 when a user operates the release button 136, the mode dial switch 138, or the jog switch 140.

The display block 106 is connected to the DSP 102. The display block 106 displays image data input from the DSP 102. The display block 106 may be a LCD (liquid crystal display), a CRT (cathode ray tube), a PDP (plasma display panel), an electro-luminescence display, etc.

The memory 110 is connected to the DSP 102. The memory 110 stores image data from the DSP 102.

The memory card 112 connects to the DSP 102. The memory card 112 may be detached from the imaging apparatus 100. The memory card 112 stores image data from the DSP 102.

The communication driver 118 is connected to the CPU 108. The communication driver 118 communicates between the imaging apparatus 100 and an external device. For example, the communication driver 118 may be a USB driver.

Figure 4:
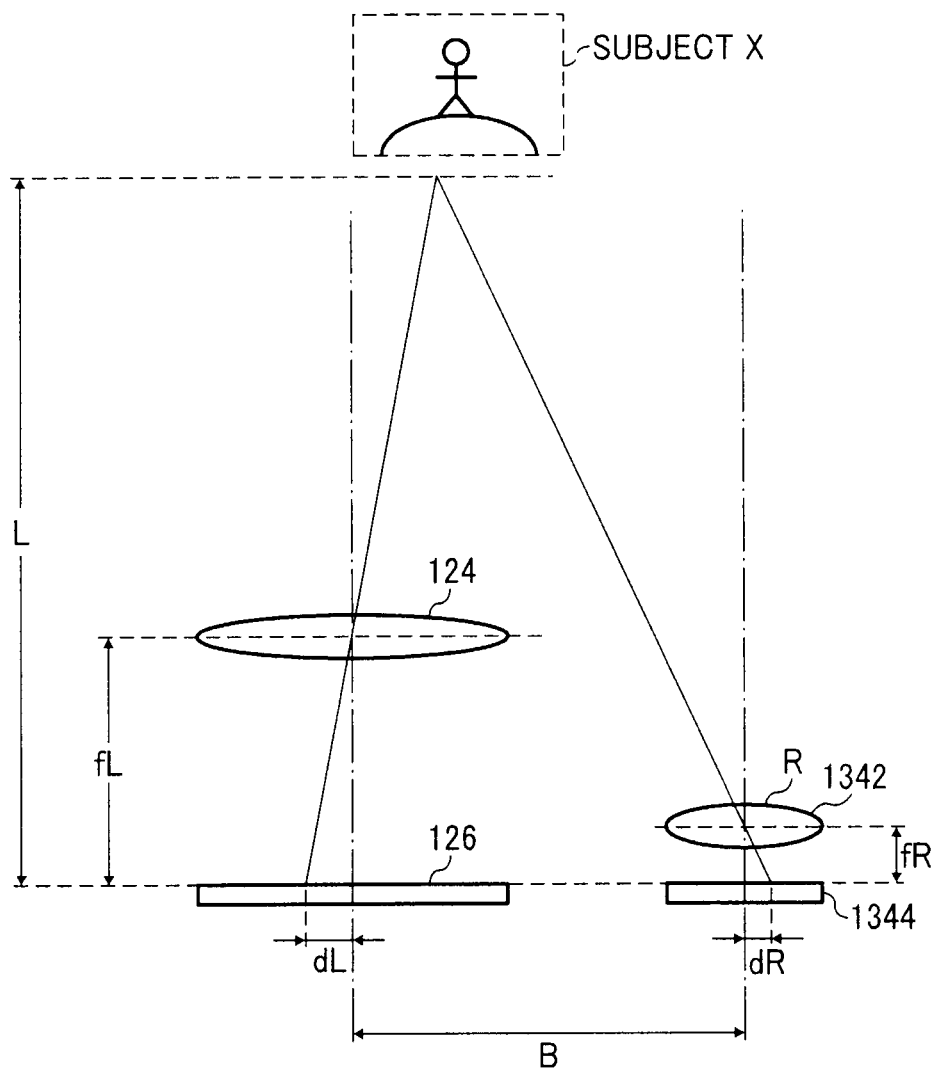
FIG. 4 illustrates a diagram showing an example of a method of distance measurement of an imaging apparatus.

A method of triangulation distance measurement is now described. FIG. 4 illustrates a diagram showing an example of a method of distance measurement of the imaging apparatus 100. FIG. 4 shows the imaging lens 124 and the first image sensor 126, which are included in the imaging optical system 122. Also, FIG. 4 shows the AF lens 1342 and the second image sensor 1344, which are included in the AF optical system 134. FIG. 4 shows a diagram of an overhead view of the imaging apparatus 100.

The imaging lens 124 and the AF lens 1342 are placed separated by a distance (base-line length) B. For example, the distance between the center axis of the first image sensor 126 and the center axis of the second image sensor 1344 is the distance B. A focusing length of the imaging lens 124 is "fL", and a focusing length of the AF lens 1342 is "fR". The "fL" is "m" times of "fR". The "m" is a focusing length ratio. Therefore, a formula of "fL=m×fR" exists.

The position of the first image sensor 126 (hereinafter, a first formed position), which forms an image of subject X through the imaging lens 124, is outside "dL" with reference to the distance B. In other words, the first formed position is outside "dL" with reference to the center axis of the first image sensor 126. The position of the second image sensor 1344 (hereinafter, a second formed position), which forms an image of subject X through the AF lens 1342, is outside "dR" with reference to the distance B. In other words, the second formed position is outside "dR" with reference to the center axis of the second image sensor 1344. Therefore, an image of subject X is formed in the first formed position and the second formed position, the first formed position is outside "dL" with reference to the center axis of the first image sensor 126, and the second formed position is outside "dR" with reference to the center axis of the second image sensor 1344.

The distance L to a subject X is calculated by the following formula 1.

$$L=\{(B+dL+dR)\times m \times fR\}/(dL+m\times dR) \quad \text{(formula 1)}$$

In formula 1, focusing lengths of right and left lenses may be different.

Also, in the case the AF optical system 134 includes two lenses of the AF lens 1342*a* and the AF lens 1342*b* (FIGS. 1C, 2C), and two image sensors of the second image sensor 1344*a* and the second image sensor 1344*b*, the distance L to a subject X may be calculated by use of image data captured by the two lenses of the AF lens 1342*a* and the AF lens 1342*b*, and two image sensors of the second image sensor 1344*a* and the second image sensor 1344*b*. In that case, because the focusing lengths of the two lenses of the AF lens 1342*a* and the AF lens 1342*b* are the same (fL=fR=f), the distance L to a subject X is calculated by the following formula 2.

$$L=\{(B+dL+dR)\times f\}/(dL+dR) \quad \text{(formula 2)}$$

According to formula 1 and formula 2, even in a case the focusing lengths of two lenses (L side and R side) are different or the same, it may identify the position of the image sensor which forms an image of a subject X with reference to the distance B, to calculate the distance to a subject X.

The distance B is decided at the time of manufacturing of the imaging apparatus 100. The focusing length ratio "m" is changed corresponding to the focusing length "fL" of the imaging lens 124. The focusing length "fL" is identified by the CPU 108 through the lens driving block 130, and thereby the focusing length ratio "m" is decided by a predetermined lens position. Therefore, the distance L of a subject X is calculated by identified "dL" and "dR".

That is, by identifying the position of an image sensor which forms an image of a subject X, "dL" and "dR" can be identified.

An operation of imaging apparatus 100, 100' is now described.

FIG. 5 is a flowchart illustrating an example of the operation of the imaging apparatus 100, 100'.

The imaging apparatus 100, 100' is set to a recording mode. The memory 110 stores compressed image data in the recording mode. For example, compressed formats include the JPEG format.

When the imaging apparatus 100, 100' is powered on in the recording mode, it performs a hardware initializing process of itself and a process that copies file information of the memory card 112 into the memory 110.

After performing these processes, a main process is started.

The imaging apparatus 100, 100' determines if the display block 106 is in a monitoring state (S502). For example, the CPU 108 determines if the display block 106 is in a monitoring state.

If imaging apparatus 100, 100' determines the display block 106 is not in the monitoring state (S502 NO), in other words in case monitoring is stopped, the imaging apparatus 100, 100' starts monitoring (S504). For example, the CPU 108 controls to start a monitoring. In the case the imaging apparatus 100, 100' starts monitoring, the imaging apparatus 100, 100' starts to drive the imaging optical system 122 and starts monitoring with driving the imaging optical system 122. In the case the imaging apparatus 100, 100' starts the main process at the beginning, in the same way, the imaging apparatus 100, 100' starts monitoring.

During monitoring, the imaging apparatus 100, 100' performs a tracking process by AE (automatic exposure) function and AWB (automatic white balance) function. The imaging apparatus 100, 100' can display image data which was processed to keep an appropriate brightness and a natural color by an AE function and AWB function, on the display block 106.

In particular, the DSP 102 calculates an estimation value for AE and AWB from image data of the imaging optical system 122, and inputs image data to the CPU 108. The CPU 108 sets an electrical shutter time to the CCD driving block 132, to be the estimation value input by the DSP 102 to a predetermined value. An electrical shutter of an image sensor has limitations of minimum time and maximum time. In the case the imaging apparatus 100, 100' underexposes or overexposes more than its limitations, the CPU 108 controls the lens driving block 130 to alternate an aperture radius of the aperture/shutter 128, and controls the CCD driving block 132 to alternate a gain of the first image sensor 126, corresponding to a subject brightness. Also, the CPU 108 performs a feedback control to adjust color parameters of image processing.

The imaging apparatus 100, 100' performs a monitoring process and an interrupt process by the operation unit 114, in parallel. In particular, the interrupt process is performed in interrupt by a fixed time timer. For example, the fixed time timer is set to a predetermined time, for example 20 ms.

Next, if imaging apparatus 100, 100' determines the display block 106 is in a monitoring state (S502 YES) or after monitoring starts (after S504), the imaging apparatus 100, 100' determines if a capturing mode is selected (S506). For example, the CPU 108 determines if a capturing mode is selected.

If the imaging apparatus 100, 100' determines a capturing mode is selected (S506 YES), the imaging apparatus 100, 100' starts electric charge (S508). For example, the capacitor 120 starts electric charge based on controls of the CPU 108.

In the case the imaging apparatus 100, 100' determines a capturing mode is not selected (S506 NO) or after starting electric charge by the step 5508, the imaging apparatus 100, 100' determines if the first switch of the release switch 136 turns on (S510). For example, the CPU 108 determines if the first switch of the release switch 136 turns on.

If the imaging apparatus 100, 100' determines the first switch of the release switch 136 turns on (S510 YES), the imaging apparatus 100, 100' determines if the second switch of the release switch 136 turns on (S512). For example, the CPU 108 determines if the second switch of the release switch 136 turns on.

If the imaging apparatus 100, 100' determines the first switch of the release switch 136 turns off (S510 NO), the process returns to the step S510. The same process continues until the first switch of the release switch 136 turns on.

If the imaging apparatus 100, 100' determines the second switch of the release switch 136 turns on (S512 YES), the imaging apparatus 100, 100' stops monitoring (S514). For example, the CPU 108 stops the monitoring.

Next, the imaging apparatus 100, 100' captures an image (S516). In case the imaging apparatus 100, 100' captures an image, as the first switch of the release switch 136 has turned on (S510 YES), the imaging apparatus 100, 100' performs the AE process. The DSP 102 estimates image data in the AE process. The DSP 102 sets exposure time values of the first image sensor 126 to the CCD driving block 132. The DSP 102 sets a gain to the first image sensor 126. The DSP 102 stores image data compressed in JPEG format in the memory 110. After capturing an image in S516, the process returns to step S502.

If the imaging apparatus 100, 100' determines the second switch of the release switch 136 turns off (S512 NO), the imaging apparatus 100, 100' determines if any other switch turns on (S518). For example, the CPU 108 determines if another switch except for the first switch and the second switch turns on.

If the imaging apparatus 100, 100' determines another switch turns on (S518 YES), the imaging apparatus 100, 100' performs a process corresponding to the switch turned on (S520). For example, the CPU 108 performs a process corresponding to the switch turned on. After performing the process, the process returns to step S502.

If the imaging apparatus 100, 100' determines another switch turns on (S518 NO), the imaging apparatus 100, 100' stops monitoring (S522). For example, the CPU 108 stops the monitoring.

The imaging apparatus 100, 100' then performs an automatic exposure (AE) process (S524). For example, the CPU 108 sets an electrical shutter time to the CCD driving block 132, to be the estimation value input by the DSP 102 to a predetermined value, based on the estimation value for AE.

The imaging apparatus 100, 100' then performs an automatic focus (AF) process (S526). For example, the automatic focus process is performed by use of the principle of triangulation. For example, the CPU 108 performs the automatic focus process by controlling the lens driving block 130 and driving the imaging lens 124. After performing the automatic focus process, then process returns to step S502.

The determination processes of S510, S512, and S518 may be performed by confirming switch information that shows if a switch, which is input by the interrupt process of the fixed time timer, was pushed. The imaging apparatus 100, 100' performs the process corresponding to the switch turned on by confirming switch information. For example, the interrupt process of the fixed time timer is performed every 20 ms. If there is no valid switch information, it repeats the loop of the determination processes without doing anything.

A method of automatic focus process is now described.

Next, a process that calculates the distance L to a subject X is described. The distance L to a subject X is calculated by identifying "dL" and "dR". FIG. 6 is a flowchart illustrating an example of a method of an automatic focus process of the imaging apparatus 100, 100'. The automatic focus process is performed by identifying "dL" and "dR".

The imaging apparatus 100, 100' calculates "dL'" and "dR" (S602). Here, "dL'" means the first formed position, which is outside "dL" with reference to the center axis of the first image sensor 126 when the imaging lens 124 is zooming. For example, the DSP 102 calculates "dL'" and "dR" by identifying each position forming an image of subject X on image sensors, the first image sensor 126 and the second image sensor 1344. Also, by converting capturing magnification of the imaging lens 124 corresponding to capturing magnification of the AF lens 1342, the imaging apparatus 100, 100' converts "dL'" to "dL". For example, the DSP 102 converts to a shift length from the center axis of the first image sensor 126.

The imaging apparatus 100, 100' calculates the distance L (S604). For example, the DSP 102 inputs "dL" and "dR" to the CPU 108. The CPU 108 calculates the distance L based on "dL" and "dR". For example, the CPU 108 calculates the distance L by use of formula 1 and formula 2 noted above.

The imaging apparatus 100, 100' converts the distance L to a move amount of a main lens, the imaging lens 124 (S606). For example, the CPU 108 converts the distance L to a move amount of the imaging lens 124. Also, the CPU 108 may calculate the move amount by subtracting a previously moved amount of the main lens from the distance L.

The imaging apparatus 100, 100' starts to move the main lens, for example the imaging lens 124 (S608). For example, the CPU 108 sets the move amount to the lens driving block 130. The lens driving block 130 starts to move the imaging lens 124, based on the move amount set by the CPU 108.

FIG. 7 is a flowchart illustrating a first example of an operation of a power saving and speedy capturing mode of the imaging apparatus 100, 100'. The power saving and speedy capturing mode is a mode that can have lower power consumptions than a normal mode and shorten a time from activating to capturing an image.

The power saving and speedy capturing mode is set as an operation mode when the imaging apparatus 100, 100' is sleeping, by use of a setting menu on the display block 106.

FIG. 7 shows a case that the power saving and speedy capturing mode is set as an operation mode when the imaging apparatus 100, 100' is sleeping. The imaging apparatus 100, 100' goes into sleeping when any switches of the operation unit 114 are not operated for more than a predetermined time. When the imaging apparatus 100, 100' is sleeping, in a case the power saving and speedy capturing mode is set, the first image sensor 126 stops to work and the display block 106 stops to display.

Also, the second image sensor 1344 stops to work except for one sensor capturing an image. For example, either the second image sensor 1344a or the second image sensor 1344b stops to work. In a case there are more than two second image sensors 1344, all but one or a part of sensors may be stopped. The second image sensor 1344 may be one sensor or plural sensors.

The imaging apparatus 100, 100' waits until the release switch 136 is pushed. If the release switch 136 is pushed, the imaging apparatus 100 performs focusing by the AF optical system 134, captures an image, and stores the captured image. Then the image apparatus 100, 100' returns to the state of sleeping until a next shutter operation by the release switch 136 is pushed.

Next, the operation is described with reference to the flowchart of FIG. 7.

The imaging apparatus 100, 100' determines if any switches of the operation unit 114 are not operated (S702). For example, the CPU 108 determines if any switches of the operation unit 114 are not operated by a user.

If the imaging apparatus 100, 100' determines any switches of the operation unit 114 are not operated (S702 YES), the imaging apparatus 100, 100' determines if a sleep transition time has passed (S704). For example, the CPU 108 counts an elapsed time since any switches of the operation unit 114 have not been operated. The CPU 108 determines if the sleep transition time has passed, by determining if the elapsed time from any switches being operated is more than the sleep transition time.

If the imaging apparatus 100, 100' determines the sleep transition time has passed (S704 YES), the imaging apparatus 100, 100' goes into a sleep state (S706). For example, the CPU 108 sets the imaging apparatus 100, 100' to a sleep state.

After going into the sleep state, the imaging apparatus 100, 100' determines if the power saving and speedy capturing mode is selected (S708). For example, the CPU 108 determines if the power saving and speedy capturing mode is selected.

If the imaging apparatus 100, 100' determines the power saving and speedy capturing mode is selected (S708 YES), the imaging apparatus 100 stops the main image sensor (the first image sensor 126) (S710). For example, the CPU 108 stops the main image sensor 126.

If the imaging apparatus 100, 100' determines any switches of the operation unit 114 are operated (S702 NO), if the imaging apparatus 100, 100' determines the sleep transition time has not passed (S704 NO), or if the imaging apparatus 100, 100' determines the power saving and speedy capturing mode is not selected (5708 NO), the process returns to step S702.

After stopping the main image sensor, the imaging apparatus 100, 100' stops AF image sensors (the second image sensor 1344 including 1344a, 1344b), except for one (S712). For example, in the case the AF optical system 134 includes plural sensors, the CPU 108 stops all AF image sensors except for one.

The imaging apparatus 100, 100' determines if a shutter button is pushed (S714). For example, the CPU 108 determines if the release switch 136 is pushed by a user.

If the imaging apparatus 100, 100' determines the shutter button is pushed (S714 YES), the imaging apparatus 100, 100' captures an image by use of the AF image sensor (S716).

The imaging apparatus 100, 100' then goes into the sleep state (S718). For example, the CPU 108 controls the imaging apparatus 100, 100' to go into the sleep state.

If the imaging apparatus 100, 100' determines the shutter button is not pushed (S714 NO), the process returns to step S714.

Therefore, by stopping the main image sensor and the AF image sensors except for one, the imaging operation 100, 100' can reduce consumed power during monitoring, and still capture an image speedily.

Figure 8:
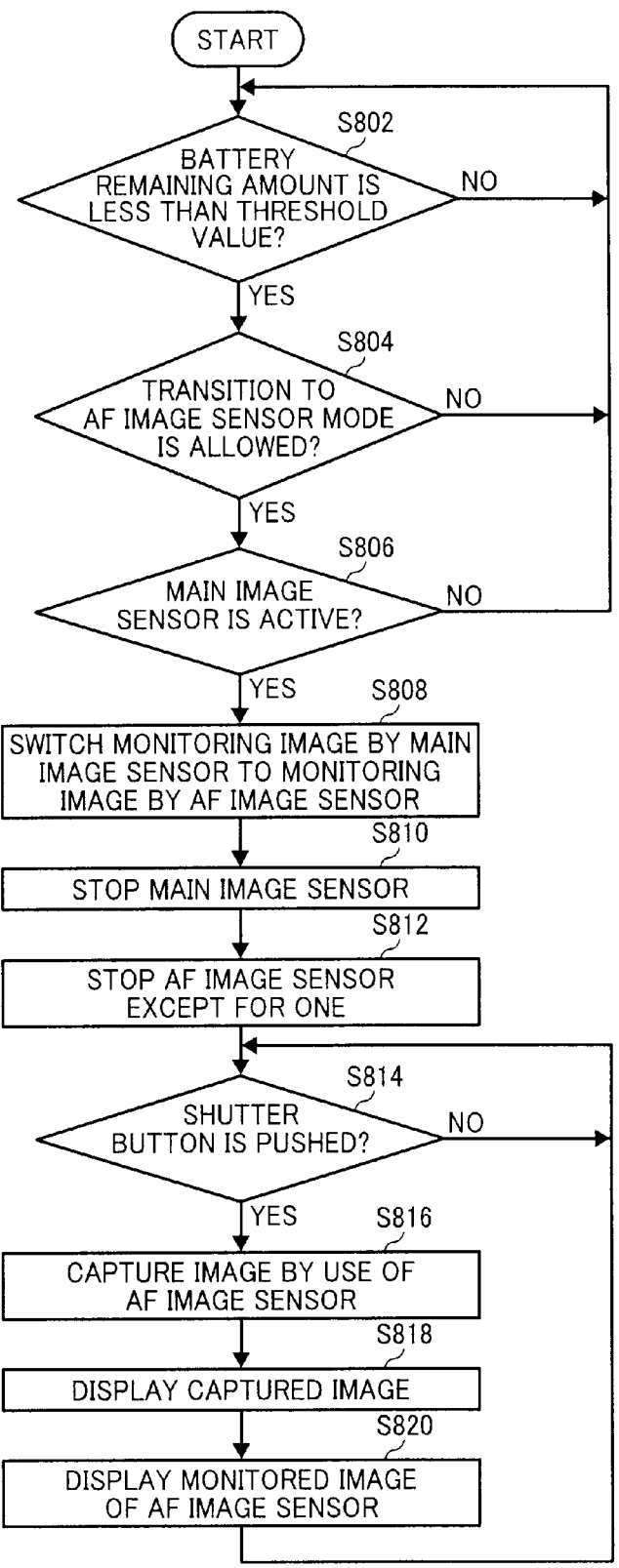
FIG. 8 is a flowchart illustrating an example of an operation considering a battery remaining amount of an imaging apparatus.

FIG. 8 is a flowchart illustrating an example of an operation when a battery remaining amount of the imaging apparatus 100, 100' is less than a threshold. FIG. 8 shows an operation of capturing an image by use of the lower power consumption AF image sensor.

The imaging apparatus 100, 100' monitors if a battery voltage is less than a threshold value, and if the battery voltage is less than the threshold value, the imaging apparatus 100, 100' determines a battery remaining amount is small. An operation mode of when the battery remaining amount is small includes an AF sensor mode. A user can set the AF sensor mode by operating the operation unit 114, with displaying a setting menu on the display block 106.

In the AF sensor mode, in a case the main image sensor is active, the imaging apparatus 100, 100' switches from monitoring of an image by the main image sensor to monitoring of an image by the lower power consumption AF image sensor. After switching monitoring image, the imaging apparatus 100, 100' stops the main image sensor. Also, the imaging apparatus 100, 100' stops the AF image sensor except for one sensor for monitoring.

After stopping the main image sensor and the AF image sensor except for one sensor for monitoring, if a shutter switch is pushed, the imaging apparatus 100, 100' captures an image by use of the lower power consumption AF image sensor that is monitoring, stores the captured image, and waits until a shutter switch is pushed again.

The above operation is now described with reference to the flowchart of FIG. 8. The imaging apparatus 100, 100' determines if the battery remaining amount is less than the threshold value (S802). For example, the CPU 108 determines if the battery remaining amount is less than the threshold value.

Figure 9:
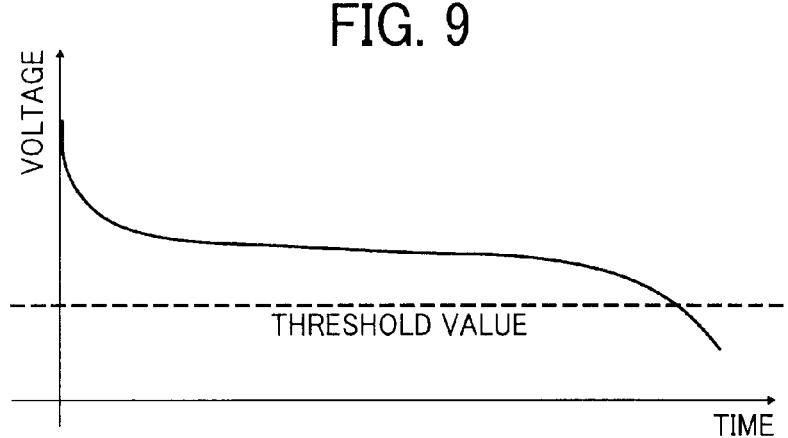
FIG. 9 illustrates a diagram showing a battery remaining amount of an imaging apparatus.

FIG. 9 illustrates a diagram showing a battery remaining amount of the imaging apparatus 100, 100'. For example, a threshold value of a predetermined battery voltage is set as a voltage for a power saving. If a battery voltage is less than the threshold value, the imaging apparatus 100, 100' determines the battery remaining amount is less than the threshold value.

If the battery voltage is over the threshold value, the imaging apparatus 100, 100' determines the battery remaining amount is not less than the threshold value.

If the imaging apparatus 100, 100' determines the battery remaining amount is less than the threshold value (S802 YES), the imaging apparatus 100, 100' determines if a transition to an AF image sensor mode is allowed (S804). For example, the CPU 108 determines if a transition to an AF image sensor mode is allowed.

If the imaging apparatus 100, 100' determines a transition to an AF image sensor mode is allowed (S804 YES), the imaging apparatus 100, 100' determines if the main image sensor is active (S806). For example, the CPU 108 determines if the main image sensor 126 is active.

If the imaging apparatus 100, 100' determines the main image sensor is active (S806 YES), the imaging apparatus 100, 100' switches monitoring an image by the main image sensor, to monitoring an image by the AF image sensor (S808). For example, the CPU 108 switches monitoring of an image by the main image sensor 126, to monitoring of an image by the AF image sensor 1344 or 1344a.

The imaging apparatus 100, 100' stops the main image sensor (S810). For example, the CPU 108 stops the main image sensor 126.

If the imaging apparatus 100, 100' determines the battery remaining amount is not less than the threshold value (S802 NO), if the imaging apparatus 100, 100' determines a transition to an AF image sensor mode is not allowed (S804 NO), or if the imaging apparatus 100, 100' determines the main image sensor is not active (S806 NO), the process returns to step S802.

The imaging apparatus 100, 100' then stops all AF image sensors except for one (S812). The AF image sensor that is not stopped is used as a sensor for monitoring. For example, the CPU 108 stops the AF image sensors except for one.

The imaging apparatus 100, 100' determines if the shutter button is pushed (S814). For example, the CPU 108 determines if the release switch 136 is pushed by a user.

If the imaging apparatus 100, 100' determines the shutter button is pushed (S814 YES), the imaging apparatus 100, 100' captures an image by use of the AF image sensor (S816).

The imaging apparatus 100, 100' then displays the captured image (S818). For example, the DSP 102 displays the captured image on the display block 106.

The imaging apparatus 100, 100' then displays a monitored image of the AF image sensor (S820). For example, the DSP 102 displays monitoring of an image of the AF image sensor on the display block 106.

If the imaging apparatus 100, 100' determines the shutter button is not pushed (S814 NO), the process returns to step S814. The imaging apparatus 100, 100' again determines if the shutter button is pushed.

Therefore, in a case a battery remaining amount is less than a threshold value, by constantly only activating the AF image sensor that has a lower consumed power than the main image sensor, reduced consumed power can be realized during monitoring, and an image can still be captured speedily.

FIG. 10 is a flowchart illustrating an example of another operation of when a battery remaining amount of the imaging apparatus 100, 100' is small. FIG. 10 shows an operation of capturing an image by use of the main image sensor. As shown in FIG. 10, the imaging apparatus 100, 100' displays a monitored image by the AF image sensor, and does not perform contrast AF by use of the main image sensor.

The imaging apparatus 100, 100' monitors if a battery voltage is less than a threshold value, and if the battery voltage is less than the threshold value, the imaging apparatus 100, 100' determines a battery remaining amount is small. An operation mode of when the battery remaining amount is small includes an AF sensor mode. A user can set the AF sensor mode by operating the operation unit 114, with displaying a setting menu on the display block 106.

In the AF sensor mode, in a case the main image sensor is active, the imaging apparatus 100, 100' switches monitoring of an image by the main image sensor, to monitoring of an image by the lower power consumption AF image sensor. After switching monitoring of an image, the imaging apparatus 100, 100' stops the main image sensor. Also, if a shutter button is pushed with the state of the switched monitoring of an image, the imaging apparatus 100, 100' starts the main image sensor. The imaging apparatus 100, 100' measures a distance by use of the main image sensor and the AF image sensor, and starts to move the main lens, the imaging lens 124, based on the measured distance. After moving the main lens, the imaging apparatus 100, 100' captures an image. After capturing an image, the imaging apparatus 100, 100' stops the main image sensor, and again displays a monitored image by the AF image sensor. The imaging apparatus 100, 100' then waits until the shutter button is pushed again.

Next, the above operation is described with reference to the flowchart of FIG. 10.

The imaging apparatus 100, 100' determines if the battery remaining amount is less than the threshold value (S1002). For example, the CPU 108 determines if the battery remaining amount is less than the threshold value.

For example, a threshold value of a predetermined battery voltage is set at a voltage for a power saving. If a battery voltage is less than a threshold value, the imaging apparatus 100, 100' determines the battery remaining amount is less than the threshold value. If the battery voltage is over the threshold value, the imaging apparatus 100, 100' determines the battery remaining amount is not less than the threshold value.

If the imaging apparatus 100, 100' determines the battery remaining amount is less than the threshold value (S1002 YES), the imaging apparatus 100, 100' determines if a transition to an AF image sensor mode is allowed (S1004). For example, the CPU 108 determines if a transition to an AF image sensor mode is allowed.

If the imaging apparatus 100, 100' determines a transition to an AF image sensor mode is allowed (S1004 YES), the imaging apparatus 100, 100' determines if the main image sensor is active (S1006). For example, the CPU 108 determines if the main image sensor 126 is active.

If the imaging apparatus 100, 100' determines the main image sensor is active (S1006 YES), the imaging apparatus 100 switches monitoring of an image by the main image sensor, to monitoring of an image by the AF image sensor (S1008). For example, the CPU 108 switches monitoring of an image by the main image sensor 126, to monitoring of an image by the AF image sensor 1344 or 1344a.

The imaging apparatus 100, 100' stops the main image sensor (S1010). For example, the CPU 108 stops the main image sensor 126.

If the imaging apparatus 100, 100' determines the battery remaining amount is not less than the threshold value (S1002 NO), if the imaging apparatus 100, 100' determines a transition to an AF image sensor mode is not allowed (S1004 NO), or if the imaging apparatus 100, 100' determines the main image sensor is not active (S1006 NO), the process returns to step S1002.

The imaging apparatus 100, 100' then determines if the shutter button is pushed (S1012). For example, the CPU 108 determines if the release switch 136 is pushed by a user.

If the imaging apparatus 100, 100' determines the shutter button is pushed (S1012 YES), the imaging apparatus 100, 100' starts the main image sensor (S1014). For example, the CPU 108 starts the main image sensor 126.

The imaging apparatus 100, 100' then measures a distance by use of the AF image sensor (S1016). For example, the CPU 108 measures a distance based on the AF image data of the AF image sensor 1344 or 1344a. Also, the CPU 108 may measure a distance based on the AF image data of the AF image sensor and the main image data of the main image sensor 126. As a result of the distance measurement, the distance L is calculated.

The imaging apparatus 100, 100' then starts to move the main lens (S1018). For example, the CPU 108 starts to move the main lens based on the distance L.

The imaging apparatus 100, 100' then captures an image by use of the main image sensor (S1020). For example, the CPU 108 captures an image by use of the main image sensor 126.

The imaging apparatus 100, 100' then displays a captured image (S1022). For example, the DSP 102 displays a captured image on the display block 106.

The imaging apparatus 100, 100' then stops the main image sensor (S1024). For example, the CPU 108 stops the main image sensor 126.

The imaging apparatus 100, 100' displays a monitored image of the AF image sensor (S1026). For example, the CPU 108 displays a monitored image of the AF image sensor on the display block 106.

If the imaging apparatus 100, 100' determines the shutter button is not pushed (S1012 NO), the process returns to step S1012, and the imaging apparatus 100, 100' again determines if the shutter button is pushed.

Therefore, in a case that a battery remaining amount is less than a threshold value, by not performing contrast AF by use of the main image sensor and measuring a distance by use of the AF image sensor, reduced consumed power can be realized compared to contrast AF by use of the main image sensor, and an increase in a maximum number of image capturing operations can be reduced. Also, an image can be captured speedily due to no contrast AF.

The present invention provides an imaging apparatus and image capturing method that can reduce consumed power and capture an image speedily.

Although the embodiments of the present invention have been described above, the present invention is not limited thereto. It should be appreciated that variations may be made in the embodiments described by persons skilled in the art without departing from the scope of the present invention.

What is claimed is:

1. An imaging apparatus, comprising:
   a first image capturing unit that captures first image data through a first optical system;
   a second image capturing unit that captures second image data through a second optical system;
   a control unit that controls the first and second image capturing units to capture an image;
   a mode switching unit that switches between (1) a normal mode and (2) a power saving and speedy capturing mode that has a lower consumed power than the normal mode;
   an operation stopping unit that stops the first image capturing unit or the second image capturing unit;
   wherein in a case the control unit controls operation to be in the power saving and speedy capturing mode, the operation stopping unit stops the first image capturing unit and the control unit captures an image by use of the second image capturing unit; and wherein the second image capturing unit includes plural image sensors, and in a case of operating in the power saving and speedy capturing mode, the operation stopping unit stops all image sensors except for one image sensor in the second image capturing unit, and the control unit captures an image by use of the one non-stopped image sensor in the second image capturing unit.

2. The imaging apparatus according to claim 1, wherein the first image capturing unit includes a first image sensor and the second image capturing unit includes a second image sensor that consumes less power than the first image sensor.

3. The imaging apparatus according to claim 1, wherein the first image capturing unit includes a first image sensor and the second image capturing unit includes second and third image sensors that consume less power than the first image sensor.

4. The imaging apparatus according to claim 3, wherein the control unit controls the second and third image sensors to perform a focus operation when operating in the power saving and speedy capturing mode.

5. An imaging apparatus, comprising:
 a first image capturing unit that captures first image data through a first optical system;
 a second image capturing unit that captures second image data through a second optical system;
 a control unit that controls the first and second image capturing units to capture an image;
 a display mode switching unit that switches between (1) a first display mode to display a monitored image of the first image data by the first image capturing unit and (2) a second display mode to display a monitored image of the second image data by the second image capturing unit; and
 a battery monitoring unit that monitors a battery remaining amount;
 wherein in a case the battery monitoring unit monitors a battery remaining amount to be less than a threshold value, the display mode switching unit switches from the first display mode to the second display mode.

6. The imaging apparatus according to claim 5, further comprising:
 an operation stopping unit that stops the first image capturing unit or the second image capturing unit;
 wherein the second image capturing unit includes plural image sensors;
 wherein in the case the battery monitoring unit monitors the battery remaining amount to be less than the threshold value, the operation stopping unit stops all image sensors except for one image sensor in the second image capturing unit, and the control unit captures an image by use of the one non-stopped image sensor in the second image capturing unit.

7. The imaging apparatus according to claim 5, wherein the control unit starts the first image capturing unit if a shutter button is pushed, and captures an image by use of the first image capturing unit based on a distance to a subject calculated by use of the second image data.

8. The imaging apparatus according to claim 5, wherein the control unit starts the first image capturing unit if a shutter button is pushed, and captures an image by use of the first image capturing unit based on a distance to a subject calculated by use of the first image data and the second image data.

9. The imaging apparatus according to claim 5, wherein the first image capturing unit includes a first image sensor and the second image capturing a unit includes a second image sensor that consumes less power than the first image sensor.

10. The imaging apparatus according to claim 5, wherein the first image capturing unit includes a first image sensor and the second image capturing unit includes second and third image sensors that consume less power than the first image sensor.

11. The imaging apparatus according to claim 10, wherein the control unit controls the second and third image sensors to perform a focus operation when operating in the power saving and speedy capturing mode.

12. An image capturing method, comprising:
 a first image capturing that captures first image data through a first optical system;
 a second image capturing that captures second image data through a second optical system;
 a controlling that controls to capture an image by the first and second image capturings;
 a mode switching that switches between (1) a normal mode and (2) a power saving and speedy capturing mode that has a lower consumed power than the normal mode;
 an operation stopping that stops the first image capturing or the second image capturing;
 wherein in case the mode switching sets the power saving and speedy capturing mode, the operation stopping stops the first image capturing and the controls captures an image by use of the second image capturing;
 wherein the first image capturing includes utilizing a first image sensor and the second image capturing includes utilizing second and third image sensors that consume less power than the first image sensor; and
 wherein the controlling controls the second and third image sensors to perform a focus operation when operating in the power saving and speedy capturing mode.

13. The image capturing method according to claim 12, wherein the first image capturing includes utilizing a first image sensor and the second image capturing includes utilizing a second image sensor that consumes less power than the first image sensor.

14. The image capturing method according to claim 12, wherein the first image capturing includes utilizing a first image sensor and the second image capturing includes utilizing second and third image sensors that consume less power than the first image sensor.

15. The image capturing method according to claim 14, wherein the controlling controls the second and third image sensors to perform a focus operation when operating in the power saving and speedy capturing mode.

16. An image capturing method, comprising:
 a first image capturing that captures first image data through a first optical system;
 a second image capturing that captures second image data through a second optical system;
 a controlling that controls to capture an image by the first and second image capturings;
 a display mode switching that switches between (1) a first display mode for displaying monitoring image of first image data and (2) a second display mode for displaying monitoring image of second image data;
 a battery monitoring that monitors a battery remaining amount;
 wherein in a case the battery monitoring monitors a battery remaining amount to be less than a threshold value, the display mode switching switches from the first display mode to the second display mode.

17. The image capturing method according to claim 16, wherein the first image capturing includes utilizing a first image sensor and the second image capturing includes utilizing a second image sensor that consumes less power than the first image sensor.

* * * * *